June 2, 1959

H. C. REYNOLDS 2,889,132

GAS PRESSURE OPERATED TRIP VALVE

Filed Sept. 8, 1953

INVENTOR
HAROLD C. REYNOLDS
BY
HIS ATTORNEY

United States Patent Office 2,889,132
Patented June 2, 1959

2,889,132

GAS PRESSURE OPERATED TRIP VALVE

Harold C. Reynolds, Athens, Pa., assignor to Ingersoll-Rand Company, New York, N.Y., a corporation of New Jersey Application September 8, 1953, Serial No. 378,888

3 Claims. (Cl. 251—33)

This invention relates to gas pressure operated trip valves, and more particularly to a valve for controlling the flow of gas under pressure provided with a trip mechanism whereby the valve may be actuated into the closed position by a relatively small force acting over a relatively very short distance.

One object of this invention is to provide a gas valve which can be tripped into the closed position by slight movement of a relatively small force.

A second object of this invention is to provide such a valve which is simple in design and relatively trouble-free in maintenance.

Figure 1:
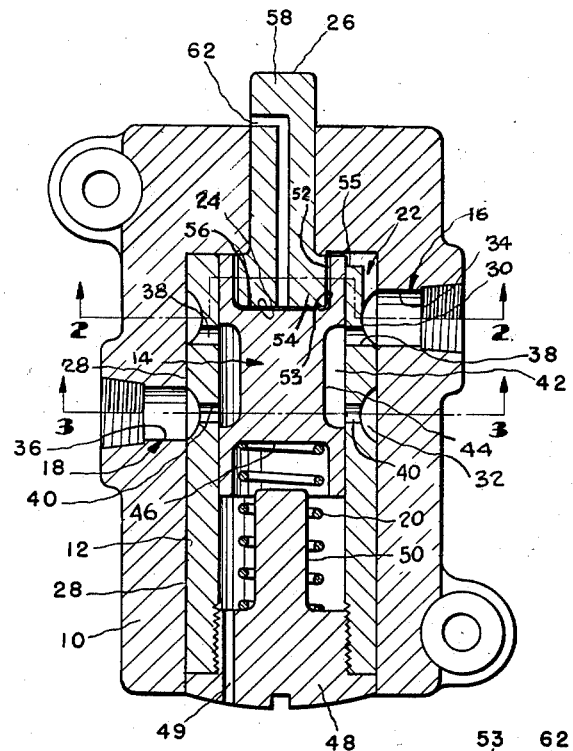

Further objects of this invention will become obvious from the following specification and drawing in which:

Figure 1 is a side elevation of a preferred form of the valve, and

Figure 2:
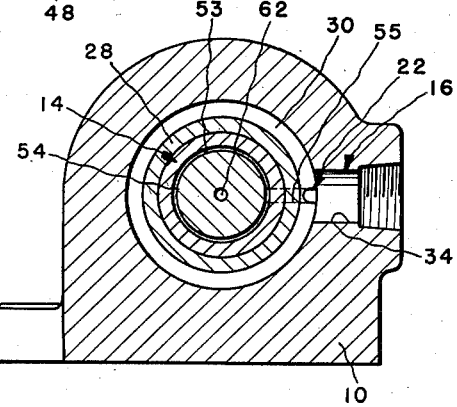
Figure 3:
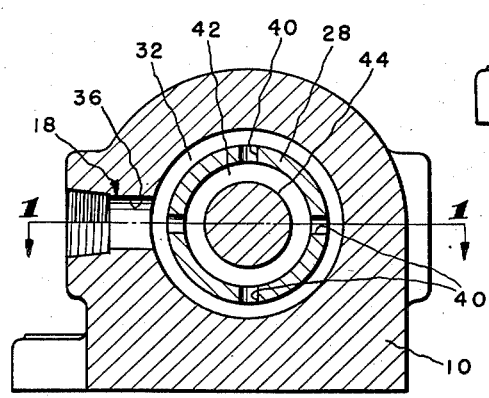

Figs. 2 and 3 are transverse views taken through Figure 1 along the lines 2—2 and 3—3, respectively, looking in the direction of the arrows.

Referring to the drawing, a preferred form of the trip valve comprises, in general, a valve body 10 having a chamber 12 wherein for a control valve 14 arranged to control communication between an inlet 16 and an outlet 18 on the opposite sides of the chamber 12. Means, such as the spring 20, acting on one end of the valve 14 constantly urges the valve 14 into its upper limiting, or open, position for communicating said inlet and outlet. The valve 14 is snapped into its closed position by means of pressure fluid constantly conducted to the opposite end of the valve 14 through a bleed passage 22 leading from the inlet 16 to the upper end surface 24 of the valve 14 and thence to the atmosphere. A trip valve 26 is arranged to control the pressure of gas acting on the end surface 24 by controlling the flow of gas through the bleed passage. In furtherance to this end the valve 26 is operable to cut-off the flow of gas to the atmosphere and thereby increase the pressure of gas exposed to the end 24 of the valve 14 to actuate the valve 14 downwardly, as viewed in Figure 1, to cut-off communication between said inlet and outlet.

Referring to the valve construction in greater detail, the control valve 14 is here illustrated as being of the spool type slidably mounted in a sleeve 28 fitted in the chamber 12. Formed in the circumference of the sleeve 28 are grooves 30 and 32 registering, respectively, with openings 34 and 36 in the body 10 and communicated with the interior of the sleeve 28 by ports 38 and 40, respectively. The groove 30, opening 34 and ports 38 serve as the inlet 16 for the chamber 12, and the groove 32, opening 36 and ports 40 serve as the outlet 18.

When the valve 14 is in its upper limiting position, as shown in Figure 1, the inlet 16 and outlet 18 are communicated through a space 42 between the reduced central portion 44 of the valve 14 and the sleeve 28. The valve 14 is normally held in this position by means of the spring 20 biased between the lower end 46 of the valve 14 and a plug 48 threaded in the lower end of the sleeve 28. A projection 50 on the plug 48 serves as a stop to limit downward movement of the valve 14 to its closed position. The lower portion of the chamber 12 is vented to the atmosphere through a port 49 in the plug 48 for the escape of any gas leaking into this portion of the chamber.

The upper end of the valve 14 is provided with a recess 52 for the reception of the head 54 of the trip valve 26. It is to be noted that the head 54 is somewhat smaller in diameter and depth than the corresponding diameter and depth of the recess 52. Thus when the head 54 is positioned within the recess 52—as when the valve 14 is in the open position—a restricted passageway, or space, 53 is defined between the head 54 and the recess. Gas is conducted to such passageway by a port 55 leading from the inlet 16 to a point at the upper end of the chamber 12. The downstream end of the port 55 is positioned such that it is partially covered by the valve 14 when it is in the open position thereby restricting the flow of gas into the passageway 53. Gas is exhausted from the recess 52 to the atmosphere through a port 62 leading from the end surface 56 on the head 54 through the valve stem 58. With this construction the port 55, recess 52 and port 62 define a bleeder passage leading from the inlet 16 between the end surfaces of the valves 14 and 26 and thence to the atmosphere, and the valve 26 serves to control the pressure of the gas acting against the surface 24.

In furtherance of this end, when the valves 14 and 26 are open the exhaust flow area, port 62, for the recess exceeds the gas inlet flow area for the recess—as restricted by the valve 14—so that the pressure in the recess is only slightly above atmospheric. Such a pressure value is insufficient to actuate the valve 14 against the force of the spring 20 but is sufficient to hold the valve 26 in the open position. However when the stem of the valve 26 is depressed slightly, the surfaces 56 and 24 are moved into contact interrupting the free escape of gas from the recess 52 and the pressure within the recess will increase almost instantaneously due to the relatively small volume of the space 53. This increase in pressure will start the valve 14 moving in the downward direction thereby uncovering the downstream end of the port 55 admitting substantially full line pressure into the upper end of the chamber 12 to snap the valve 14 into the closed position—i.e., the upper head portion of the valve 14 covers the opening 34 to cut-off communication between the inlet 16 and outlet 18. The flow area through the port 62 is smaller than the flow area of the now fully open port 55 (see Figs. 2 and 3) and accordingly the pressure in the recess will remain at a sufficiently high value to hold the valve 14 closed so long as pressure fluid is supplied to the inlet 16. When this supply is cut-off, as by a valve (not shown), pressure within the recess 52 will bleed off rapidly through the port 62 reducing the force exerted on that end of the valve 14 to a point whereat the spring 20 will return the valve 14 to its open position.

Reviewing briefly the operation of the valve it will be assumed that the various elements are positioned as shown in Figure 1 and that gas under pressure is being supplied to the inlet 16. Under these conditions gas will flow from the opening 34 around the groove 30 and through the ports 38 and thence through the space 42 to the outlet 18. At the same time gas under pressure is being constantly bled from the inlet passage 16 through the port 55 to the recess 52, or space 53, and thence to the atmosphere through the port 62. In this position of the valve 14, flow from the port 55 is restricted by the valve 14 such that there is sufficient pressure drop of the gas in passing from the port 55 to the recess that the force of gas pressure acting on the end 24 of the valve 14 will not overcome the oppositely directed force exerted on the valve 14 by the spring 20.

When the trip valve 26 is actuated to place the surfaces 24 and 56 in contact and thereby restrict or interrupt the flow of gas from the recess 52 through the port 62, the pressure of gas in the recess 52, or space 53, will immediately rise to a value sufficient to actuate the valve 14 downwardly against the pressure of the spring 20. Such movement of the valve 14 uncovers the downstream end of the port 55 admitting line pressure to the pressure surface 24 to snap the valve 14 into its closed position. The valve 14 will remain in the closed position until the supply of gas under pressure to the inlet is cut-off. Pressure fluid will then leak from the upper end of the chamber 12 through the port 62 thereby lowering the force tending to hold the valve 14 closed. The spring 20 will thereafter reset the valve 14 in its open position.

I claim:

1. In a gas pressure operated valve, a valve body having a valve chamber therein, an inlet for gas under pressure and an outlet for such gas for said chamber, a valve slidably mounted in said chamber for controlling communication between said inlet and outlet and having a pressure surface on one end thereof, means constantly urging the valve into the open position, a port leading from said inlet to the end of the chamber associated with said one end of the valve for supplying gas under pressure to said pressure surface, a trip valve having a surface in normally spaced face relation with said pressure surface, and a port leading from the trip valve surface to the atmosphere, said trip valve being operable to place said surfaces in contact to cut-off flow through the last said port for increasing the pressure of gas supplied to said pressure surface to actuate the first said valve into the closed position.

2. In a gas pressure operated valve, a valve body having a valve chamber therein, an inlet for gas under pressure and an outlet for such gas for said chamber, a control valve slidably mounted in said chamber for controlling communication between said inlet and outlet and having a pressure surface on one end thereof, means urging said valve into the open position, a port for supplying gas under pressure to said surface and leading from the inlet to a point at one end of said chamber such that the port is partially covered by said valve when in the open position, and a trip valve having a surface normally positioned in spaced face relation with said pressure surface, and a port leading from said trip valve surface to the atmosphere, the trip valve being movable to place said surfaces in contact to cut-off flow through the second said port and increase the pressure of gas acting against said pressure surface to actuate the control valve to uncover the second said port and close the control valve.

3. In a fluid pressure operated valve, a valve body having a chamber therein, said chamber having an inlet and an outlet for fluid, a valve in the chamber operable into one position to establish communication between said inlet and said outlet and into another position to cut off such communication, spring means constantly urging said valve into one of said positions, means defining a pressure chamber of relatively small volume as compared to the volume of said chamber, fluid pressure operated means having a pressure surface thereon exposed to fluid in said pressure chamber for actuating said valve into the other of said positions, an inlet passage for constantly supplying fluid under pressure to said pressure chamber and an outlet passage for said pressure chamber, the down stream end of said inlet passage being positioned to be partially covered by the valve when the valve is in the first said position such that the outlet passage is of greater cross-sectional flow area than that of the inlet passage for maintaining the pressure of fluid in said pressure chamber at a relatively low value, and a trip valve to cut off flow through said outlet passage to immediately increase the pressure of fluid in said pressure chamber for actuating the first said valve into said other position.

References Cited in the file of this patent

UNITED STATES PATENTS

| | | |
|---|---|---|
| 209,867 | Craigie | Nov. 12, 1878 |
| 703,687 | Warren | July 1, 1902 |
| 993,628 | Williams | May 30, 1911 |
| 1,307,207 | Mitchell | June 17, 1919 |
| 1,638,519 | Brooks | Aug. 9, 1927 |
| 2,013,665 | Messier | Sept. 10, 1935 |
| 2,055,576 | Hollerith | Sept. 29, 1936 |
| 2,081,465 | Stewart | May 25, 1937 |
| 2,273,535 | Peo | Feb. 17, 1942 |
| 2,366,246 | Erbguth | Jan. 2, 1945 |